US012705015B2

(12) United States Patent
Gupta et al.

(10) Patent No.: US 12,705,015 B2
(45) Date of Patent: Aug. 11, 2026

(54) ACCESSIBLE AUDIO INTENT VISUALIZATION FOR INTERACTIVE ENVIRONMENTS

(71) Applicant: Sony Interactive Entertainment Inc., Tokyo (JP)

(72) Inventors: Rajeev Gupta, London (GB); Mark Jacobus Breugelmans, London (GB); Carl Pryke, London (GB); Lloyd Preston Stemple, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 309 days.

(21) Appl. No.: 18/326,108

(22) Filed: May 31, 2023

(65) Prior Publication Data

US 2023/0401027 A1 Dec. 14, 2023

(30) Foreign Application Priority Data

Jun. 9, 2022 (GB) ...................................... 2208444

(51) Int. Cl.
*G06F 3/16* (2006.01)
*G06F 3/01* (2006.01)

(52) U.S. Cl.
CPC .............. *G06F 3/165* (2013.01); *G06F 3/012* (2013.01)

(58) Field of Classification Search
CPC ................................. G06F 3/165; G06F 3/012
See application file for complete search history.

(56) References Cited

U.S. PATENT DOCUMENTS

| | | | | |
|---|---|---|---|---|
| 2005/0041161 | A1 | 2/2005 | Dowling | |
| 2011/0283865 | A1 | 11/2011 | Collins | |
| 2018/0020312 | A1 * | 1/2018 | Visser | G06F 3/011 |
| 2019/0060758 | A1 | 2/2019 | Ge | |
| 2019/0293278 | A1 | 9/2019 | Bayou | |
| 2020/0070044 | A1 | 3/2020 | Seo | |
| 2020/0184927 | A1 | 6/2020 | Jung | |
| 2021/0146237 | A1 | 5/2021 | Savill | |
| 2021/0339132 | A1 * | 11/2021 | Shakespeare | A63F 13/537 |

FOREIGN PATENT DOCUMENTS

| | | | |
|---|---|---|---|
| WO | 2021222923 | A1 | 11/2021 |

OTHER PUBLICATIONS

Combined Search and Examination Report for corresponding GB Application No. 2208444.6, 10 pages, dated Dec. 1, 2022.

Search Report for corresponding GB Application No. 2208444.6, 2 pages, dated Dec. 15, 2023.

* cited by examiner

*Primary Examiner* — Joseph Saunders, Jr.
(74) *Attorney, Agent, or Firm* — Kilpatrick Townsend & Stockton LLP

(57) ABSTRACT

An audio visualisation method includes: generating for output a virtual environment comprising at least a first virtual sound source, classifying an intended effect on a user of a sound to be output by the at least first virtual sound source, outputting the sound, and producing a visual element for view by the user that has a visual property selected to correspond to the classified intended effect.

17 Claims, 3 Drawing Sheets

ACCESSIBLE AUDIO INTENT VISUALIZATION FOR INTERACTIVE ENVIRONMENTS

BACKGROUND OF THE INVENTION

Field of the Invention

The present invention relates to an audio processing system and method.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

It is a common goal of video games to be accessible to the largest number of users, whilst the same time managing the complexity of creating and representing a virtual world for users with diverse needs.

In particular, it is important to make games accessible to users who are deaf or hard of hearing. A common approach is to provide subtitles that transcribe dialogue and sometimes also describe audio events such as laughter, music, or elements key to the plot, such as a particular gunshot.

However, such facilities are still open to improvement.

The present invention seeks to mitigate or alleviate the above problem.

SUMMARY OF THE INVENTION

Various aspects and features of the present invention are defined in the appended claims and within the text of the accompanying description.

In a first aspect, an audio visualisation method is provided in accordance with claim 1.

In another aspect, an audio visualisation apparatus is provided in accordance with claim 15.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

An audio processing system and method are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1:
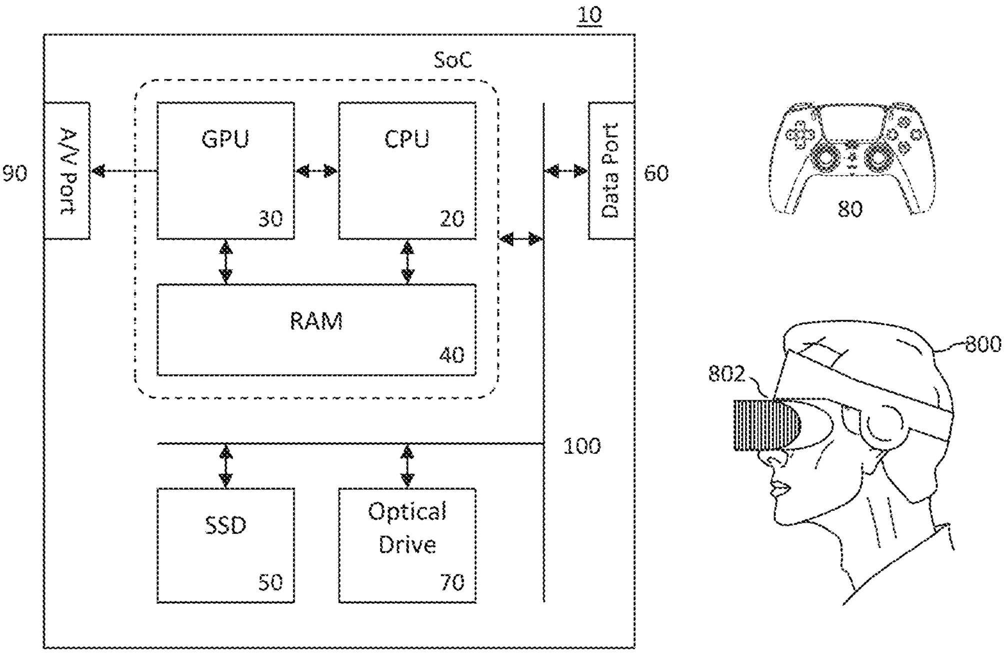
FIG. 1 is a schematic diagram of an audio processing system in accordance with embodiments of the present description.

Referring now to the drawings, wherein like reference numerals designate identical or corresponding parts throughout the several views, FIG. 1 shows an example of an entertainment system 10 such as a computer, or a console like the Sony® PlayStation 5 ® (PS5).

The entertainment system 10 comprises a central processor 20. This may be a single or multi core processor, for example comprising eight cores as in the PS5. The entertainment system also comprises a graphical processing unit or GPU 30. The GPU can be physically separate to the CPU, or integrated with the CPU as a system on a chip (SoC) as in the PS5.

The entertainment device also comprises RAM 40, and may either have separate RAM for each of the CPU and GPU, or shared RAM as in the PS5. The or each RAM can be physically separate, or integrated as part of an SoC as in the PS5. Further storage is provided by a disk 50, either as an external or internal hard drive, or as an external solid state drive, or an internal solid state drive as in the PS5.

The entertainment device may transmit or receive data via one or more data ports 60, such as a USB port, Ethernet® port, WiFi® port, Bluetooth® port or similar, as appropriate. It may also optionally receive data via an optical drive 70.

Interaction with the system is typically provided using one or more handheld controllers 80, such as the DualSense® controller in the case of the PS5.

Audio/visual outputs from the entertainment device are typically provided through one or more A/V ports 90, or through one or more of the wired or wireless data ports 60.

Where components are not integrated, they may be connected as appropriate either by a dedicated data link or via a bus 100.

An example of a device for displaying images output by the entertainment system is a head mounted display 'HAM' 802, worn by a user 800.

Figure 2A:
FIG. 2A is an image from a videogame.
Figure 2B:
FIG. 2B is the image from the video game in accordance with embodiments of the present description.
Figure 3:
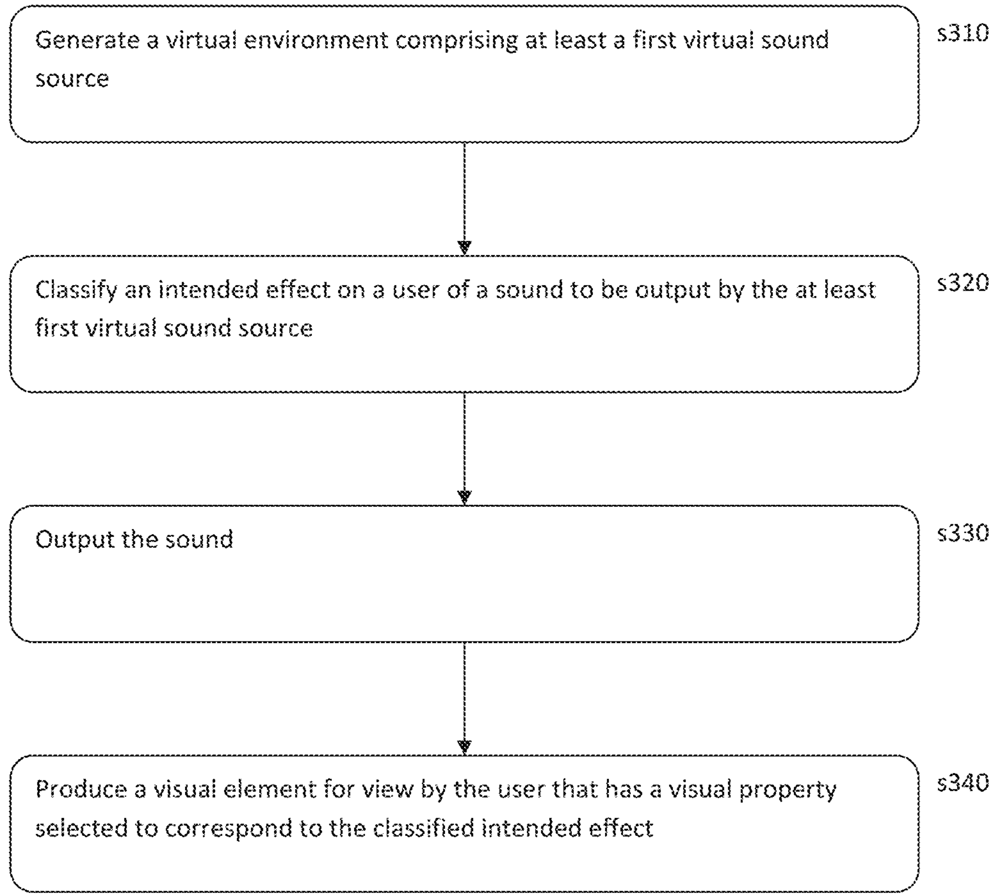
FIG. 3 is a flow chart of an audio processing method in accordance with embodiments of the present description.

Referring now also to FIGS. 2A and 2B and FIG. 3, in embodiments of the present description, an audio visualisation method comprises in a first step s310 generating a virtual environment comprising at least a first virtual sound source. In FIG. 2A, a virtual environment is shown in which a main character is being chased by several monsters. In this case, the main character and each of the monsters may be virtual sound sources, as may be other elements of the environment.

At any given moment the environment may comprise no virtual sound sources or no active virtual sound sources, or one or more active virtual sound sources, where an active virtual sound source is one associated with audio data that is in the process of being output to be heard by the user.

As noted above, for users who are deaf or hard of hearing, this audio data may not be heard at all or may only be partially heard, and as a result the intended effect of the audio on the user may be lost.

In particular, certain audio may be intended to engender an emotional effect in the user, such as fear or tension whereas other audio may be intended to provide dialogue, or inform the user about the nature of the environment (common examples being changes in the sound of the user's footsteps on different surfaces, or the sounds when objects are picked up and put down, or destroyed). Still other audio may be character driven, either in terms of dialogue or exclamations.

As a non-limiting example, in FIG. 2A the main character is making an exclamation, whilst the monster closest to the character is making an aggressive sound indicating that they are about to attempt an aggressive attack on the main character. However, to a user with hearing impairment this may not be clear; they may be concerned that they are missing important dialogue from the character, and it may be difficult to tell which if any of the monsters are making the aggressive sound, and hence know which monster to dodge away from.

To assist this user, step S320 of the method comprises classifying an intended effect on a user of a sound to be output by the at least first virtual sound source.

This classification of intent can be simple or made more complex, as required.

A simple set of classifications may be whether a sound is intended to be friendly, neutral, or aggressive. Alternatively or in addition, another simple set of classifications may be whether a sound is intended to be perceived as voiced, unvoiced, or environmental. Alternatively or in addition, a another simple set of classifications may be whether a sound is intended to be associated with a scripted event (or animation), or is background (ambient). Alternatively or in addition, another simple set of classifications may be the emotional intent of the sound, for example along a spectrum of happiness or laughter, interest or information, awareness (e.g. of the environment), and tension or fear. Alternatively or in addition, yet another simple set of classifications may be whether the sound is intended to be perceived as dialogue, spoken exclamations, other sounds, or music. Alternatively or in addition, yet another simple set of classifications may be whether the sound is intended to be quiet, medium volume, or loud.

It will be appreciated that any suitable combination of the above examples or any other suitable example may be used to form a set of classifications of intent, and that multiple sets of classifications may be grouped together, or may be used separately to drive different aspects of the method, as described elsewhere herein.

More generally it will be appreciated that an intended effect on a user may be considered to be an intended effect relating to understanding (e.g. of story or character), awareness (e.g. of the environment or elements therein), emotion (e.g. happiness or sadness), or physiological response (e.g. shock or surprise).

The classification may be enabled by metadata associated with a sound (e.g. with a sound file), and/or with a sound component (e.g. in the case of in-game sound synthesis, in which contributory sounds used to generate a sound output may be similarly tagged and the tags may feed through to the produced sound). Alternatively or in addition such metadata may be associated with the sound source, for example assuming that any sound emitted by the monsters in FIG. 2B would be alarming. In this case for example, this might enable environmental sounds such as footsteps to be treated as neutral when played for the main character, but treated as alarming when played for a monster creeping up on the player. Such metadata may optionally also specify the type of visual element (modification, icon, word etc.) to use, although typically these are associated with the classification.

Hence optionally the step of classifying an intended effect on a user of a sound to be output by the at least first virtual sound source may comprise retrieving metadata associated with respective sounds that identifies the classified intended effect, and optionally identifies the modification, icon, word etc.) to use.

It will be appreciated that various strategies may be adopted for such metadata; for example a sound could have different meta data for use with different classes of sound source, different in-game locations, and the like. Similarly meta data for sounds could indicate if they that priority over other sounds for visualisation purposes, or override metadata of sound sources for such purposes (and vice-versa). Likewise if a sound is associated with a scripted event, it may have priority over any other sound.

In a third step S330 of the method, the sound is output to be heard by the user; whether it is actually heard by the user (who may be hearing impaired) is not essential.

Referring now also to FIG. 2B, at substantially the same time, in fourth step S340 of the method, a visual element is produced for view by the user that has a visual property selected to correspond to the classified intended effect.

This visual element may comprise one or more colours, one or more shapes, a degree of brightness, a degree of transparency, a size, or some other property that is chosen to correspond with the classified intended effect.

Preferably the correspondence is fixed/consistent so that users learn a visual grammar that corresponds to the intended effect of the audio. This visual grammar may be specific to an individual game, or may be applied consistently across multiple titles either within a single game franchise, or single publishers games, or across games implementing techniques described herein, or accessing system software that implements techniques described herein, on a particular console or other platform.

Again as non-limiting examples, non-dialogue voiced audio from the main character and intended to help the user empathise with the character's situation is shown in FIG. 2B using circles emitting from the character's mouth. Meanwhile the aggressive sound from the closest monster is shown in FIG. 2B using a graphical icon that might be automatically associated with danger.

Optionally, scripted elements of a game could suspend the above techniques, for example to avoid distractions in key scenes, or to assist with a visual scare or other element of the game.

Similarly, the above techniques may be subject to a volume threshold, so that sounds below that threshold are not visually augmented, or similarly a distance threshold within the virtual environment, and/or a number threshold, limiting the number of such augmentations visible at any one time.

With these visual elements in place, a user with a hearing impairment can tell that the main character is crying out but not talking, whilst the closest monster is about to attack. This helps the user to play the game in a similar manner to a user who can hear the audio cues and content the game provides.

Hence more generally, the step of producing a visual element may comprise adding at least one of a plurality of predetermined colours to at least part of the virtual environment, the predetermined colours being respectively associated with different intended effects on the user of a sound.

Alternatively or in addition, the step of producing a visual element may comprise adding at least one of a plurality of predetermined icons (e.g. any suitable graphical overlay) to at least part of the virtual environment, the predetermined icons being respectively associated with different intended effects on the user of a sound.

Alternatively or in addition to icons, words may be displayed. These may, for example, be onomatopoeic words corresponding to the audio, Hence in FIG. 2B, the circles may be supplemented or replaced with a 'Weee!' written exclamation, whilst the monster's graphical icon may be supplemented or replaced with 'Roar! '.

In any case, optionally the visual element may (alternatively or in addition) be modified to change one or more selected from the list consisting of brightness, saturation, shape, and scale, responsive one or more of the audio properties of the sound, as described elsewhere herein.

Typically the step of producing a visual element comprises adding the element at a location in the virtual environment corresponding to the location of the virtual sound source, although whilst preferable, this is not essential and not always possible, as described elsewhere herein.

The above techniques refer to the use of meta data to tag sounds and/or virtual sound sources within the game. Hence this assumes of the game is adapted to incorporate the above techniques.

However it is also desirable to provide such facilities for existing so-called 'legacy' games, whose code is set and may not be easily adapted to incorporate such a technique.

Accordingly, optionally rather than the above techniques being implemented by the game itself, they may be implemented by the operating system or a helper app thereof that is monitoring a legacy game. References herein to the operating system may be assumed to also optionally refer to a helper app thereof.

In a first instance, whilst it may not be possible to adapt the legacy game itself, it should be possible to review the sound files that are used within the game, and associate with the sound files meta data relating to the intended effect of the sound on the user similar to that already described herein, so that the same basic technique may be used.

In this case, the operating system detects when a sound file is accessed or in use at a predetermined stage, and looks at the associated meta data. When the sound file data is in an audio output buffer, the associated meta data is used to drive the production, by the operating system, of an overlaid visual element for view by the user in a similar manner to that already described herein.

In this way, the appropriate visual element can be produced while the relevant sound is being played.

In the case of the legacy game, it may not be possible to identify the virtual sound source within the virtual environment, as this is information within the game itself.

However, some degree of localisation may be possible based on the audio mix of the sound, typically relative to the virtual camera position being used to generate images of the virtual environment.

At its most basic, a stereo mix will indicate how far to the left or right of the centre of field of view of the virtual camera the sound is located. In this case the visualisation may be located at the corresponding degree to the left or right of the centre of the field of view of the resulting image, either within the main image itself, or at a periphery of the image.

For a more sophisticated approximation, a so-called 5.1 or 7.1 surround sound mix may give an indication of both left and right and also front and rear position, thereby approximating an x-z location in the virtual environment, typically relative to the virtual camera position being used to generate images of the virtual environment.

In this case, optionally the visual element may be produced as an overlay or modification of the virtual environment at the corresponding x-z position, in a similar manner to the visual elements described previously herein. In the event that a so-called Z buffer of the game can be accessed and parsed by the operating system, then optionally an object at this x-z location may be identified as the likely sound source and augmented in a substantially similar manner to that described previously herein.

In this way, the audio of a legacy game may be tagged with meta data for use substantially as described elsewhere herein, and the audio mix of the legacy game may be used to indicate the direction or the location of the sound within the virtual environment, and optionally to identify the object within the virtual environment acting as the sound source, without further modification of the legacy game.

Hence more generally the step of generating a visual element may comprise adding the element at a location in the virtual environment corresponding to the direction or location of the virtual sound relative to a predetermined position (such as the virtual camera) within a virtual sound stage (as produced by the audio mix).

For such legacy games, it may be difficult to manually tag sound files without knowledge of their purpose, and/or without the context of seeing them used in game.

Similarly, it may be impractical to manually tag sound files for potentially many hundreds or thousands of legacy games, if it was desirable to provide the techniques herein to a back catalogue of games, for example a back catalogue accessible via a cloud gaming service.

Accordingly, in embodiments of the present description the meta data for such sound files may be generated automatically by analysing the sound to identify one or more audio properties; and classifying an intended effect based upon one or more of the identified audio properties. The classification can then be used as meta data similar to that for the techniques described elsewhere herein.

In this case, the audio properties may be any suitable audio properties, but may optionally comprise one or more selected from the list consisting of rate of attack in the sound envelope, rate of decay in the sound envelope, frequency distribution in the sound, the presence of vocalisation in the sound, absolute volume of the sound, volume of the sound relative to other sounds in the virtual environment, and duration of the sound.

As described elsewhere, the visual element produced in response to the or each audio property may be produced in a consistent manner, for example using lookup tables, heuristics or the like, so that the user can develop an understanding of a visual grammar corresponding to the, that is consistent not only within one game but potentially across an entire back catalogue of games that are processed in this manner.

Hence for example a high rate of attack in the sound envelope together with a high absolute volume might be indicative of an intent to shock, such as a bark of an animal, or to warn the user of a dangerous event such as an explosion; hence in this case the meta data may indicate an intent to shock or alarm, and result in the generation of a visual element similar to that shown for the monster in FIG. 2B.

Meanwhile a vocalisation at a high volume with a short duration and high pitch/frequency distribution might be assumed to be an exclamation; hence in this case the meta data may indicate a non-dialogue character exclamation and result in the generation of a visual element similar to that shown for the main character in FIG. 2B.

Meanwhile for example vocalisation in a typical voiced frequency distribution may be indicative of dialogue and tagged accordingly.

Hence using this approach, a consistent visual grammar can again be developed that is based upon the classification of intent, in turn based upon one or more of the identified audio properties.

Alternatively or in addition, all or some of this visual grammar can be based upon identified audio properties directly; hence for example the rate of attack in the sound envelope might affect brightness or saturation of the visual element; meanwhile volume might affect, colour, transparency (or lack thereof) or brightness, whilst the detection of voiced sounds might call selection of a particular graphical element to be optionally modified according to one or more other properties, and so on.

For the above techniques where the sound is analysed to generate a classification, the analysis of a respective sound is performed before the sound is output. This is done because potentially relevant audio properties may only become apparent during the course of playback, by which stage it is too late to provide a visual indication of the sound.

In the case where meta data is being generated for a game or a library of games in advance of their use, clearly the analysis of the sounds is being performed before the sound is output during play. Such a library of games may be processed in this manner for use in a streaming service, such as PS Now®.

Even if not used (or not exclusively used) for a streaming service, alternatively or in addition for example if an operating system detects execution of a legacy game, for example by loading an optical disk of the game, the operating system may determine the title of the game, and request data associating the audio files of the game with meta data from a central server comprising a repository of data for one or more legacy games including the currently detected legacy game.

However, if no such data is available, then optionally the operating system may perform the above analysis itself, for example when loading assets during game play, or when an audio file is accessed for imminent playback; once each audio file is analysed, the system may then associate it with the corresponding meta data to build up meta data descriptors for the game.

Optionally, the operating system may upload data associating at least some audio files of the game with meta data to a central server to help form a repository of data for one or more legacy games, thereby enabling the creation of an ever more complete repository of data for legacy games.

Variants

The above techniques assume that the visual element is incorporated into or superposed upon or at the periphery of the graphical presentation of the virtual environment, and then displayed on a TV or a head-mounted display to the user.

However, the above techniques need not be limited to this.

Hence in a variant embodiment the step of generating a visual element comprises driving a directional illumination separate to a primary display of the virtual environment. In this case the directional illumination indicates the direction of the sound, typically relative to the virtual camera position.

In one case, the directional illumination physically surrounds the primary display, for example as a series of addressable LEDs. For example LEDs or other lights encircling the display may correspond to audio sources encircling the virtual viewpoint of the user, with LEDs at the bottom of the display corresponding to audio sources behind the user. These may then be used to indicate one or more audio sources. If at least some of the LEDs are multicolour, then colour can be used to indicate intended effect on the user. Similarly brightness and optionally strobing frequency may be used as part of a visual grammar to indicate intended effects on the user.

In a similar approach, a directional illumination may physically surround the user; for example a mat may comprise LEDs or other lights around its periphery; when the user stands on the mat the lights indicate the relative direction of one or more sounds, and again elements such as colour, brightness and strobing frequency may be used as part of visual grammar to indicate intended effects of the sounds on the user.

Again similarly a directional illumination may be located on a handheld controller used by the user. In the case of the DualSense® controller, LEDs or other lights may encircle the touchpad in the centre portion of the controller; the touchpad may be used as a visual proxy for the primary display, and the LEDs indicate the direction of the sound in a similar manner to when they physically surround the primary display itself, as described previously.

The indications may also be provided on a separate screen, such as on a phone running a companion app. The separate screen may be physically separate as in the case of a phone or a dual-screen device, or logically separate, as in the case of a map overlay that may already be provided by the game; in this case the visual element may alternatively or in addition be provided within the map in a manner consistent with however the map is presented in-game.

It will be appreciated that the above methods may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

Accordingly, in a summary embodiment of the present description, an audio visualisation apparatus (such as entertainment device 10, for example a PlayStation 5®), comprises the following.

A graphics processor (such as GPU 30 and/or CPU 20) adapted (for example by suitable software instruction) to generate for output a virtual environment comprising at least a first virtual sound source.

A classification processor (such as GPU 30 and/or CPU 20) adapted (for example by suitable software instruction) to classify an intended effect on a user of a sound to be output by the at least first virtual sound source.

An audio processor (such as GPU 30 and/or CPU 20) adapted (for example by suitable software instruction) to output the sound (for example outputting to A/V port 90).

And, a visualisation processor (such as GPU 30 and/or CPU 20) adapted (for example by suitable software instruction) to produce a visual element for view by the user that has a visual property selected to correspond to the classified intended effect.

Instances of this summary embodiment implementing the methods and techniques described herein (for example by use of suitable software instruction) are envisaged within the scope of the application, including but not limited to that:

- classifying an intended effect on a user of a sound to be output by the at least first virtual sound source comprises retrieving metadata associated with respective sounds that identifies the classified intended effect, as described elsewhere herein;

classifying an intended effect on a user of a sound to be output by the at least first virtual sound source comprises analysing the sound to identify one or more audio properties, and classifying an intended effect based upon one or more of the identified audio properties, as described elsewhere herein;

the audio properties comprise one or more selected from the list consisting of rate of attack in the sound envelope, rate of decay in the sound envelope, frequency distribution in the sound, the presence of vocalisation in the sound, absolute volume of the sound, volume of the sound relative to other sounds in the virtual environment, and duration of the sound, as described elsewhere herein;

in either of the above two cases, optionally the analysis of a respective sound being performed before the sound is output, as described elsewhere herein;

In this instance, optionally the analysis being used to generate metadata associated with the respective sound that identifies the classified intended effect, as described elsewhere herein;

producing a visual element comprises adding at least one of a plurality of predetermined colours to at least part of the virtual environment, the predetermined colours being respectively associated with different intended effects on the user of a sound, as described elsewhere herein;

producing a visual element comprises adding at least one of a plurality of predetermined icons to at least part of the virtual environment, the predetermined icons being respectively associated with different intended effects on the user of a sound, as described elsewhere herein;

in either of the above two cases, optionally the visual element is modified to change one or more selected from the list consisting of brightness, saturation, shape, and scale, responsive to one or more of the audio properties of the sound, as described elsewhere herein;

producing a visual element comprises adding the element at a location in the virtual environment corresponding to the location of the virtual sound source, as described elsewhere herein;

producing a visual element comprises adding the element at a location in the virtual environment corresponding to the direction or location of the virtual sound relative to a predetermined position within a virtual sound stage, as described elsewhere herein;

producing a visual element comprises driving a directional illumination separate to a primary display of the virtual environment, as described elsewhere herein; and in this case, optionally the directional illumination is one or more selected from the list consisting of a directional illumination physically surrounding the primary display, a directional illumination physically surrounding the user, and a directional illumination located on a handheld controller used by the user, as described elsewhere herein.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method, comprising:

generating a virtual environment comprising a virtual sound source;

prior to outputting a sound, classifying an intended effect on a user of the sound that is to be output to the user, the sound corresponding to the virtual sound source, a class of the intended effect being selected from (i) understanding, (ii) awareness, (iii) emotion, and (iv) physiological response, wherein classifying the intended effect on the user comprises analyzing metadata associated with the sound and metadata associated with the virtual sound source;

selecting, according to a consistent visual grammar, a type of visual element based on the classified intended effect, the type of visual element being selected from a color, an icon, a word, or a shape;

outputting the sound; and producing a visual element of the selected type of visual element for view by the user that has at least one visual property selected to correspond to the classified intended effect, the at least one visual property including one or more of brightness, saturation, shape, and scale.

2. The method of claim 1, wherein classifying the intended effect further comprises analyzing a sound component of the sound, and the sound component comprises one or more of:

i. rate of attack in a sound envelope;

ii. rate of decay in the sound envelope;

iii. frequency distribution in the sound;

iv. a presence of vocalization in the sound;

v. absolute volume of the sound;

vi. volume of the sound relative to other sounds in the virtual environment; and vii. duration of the sound.

3. The method of claim 1, further comprising:

generating the metadata associated with the sound.

4. The method of claim 1, wherein producing the visual element comprises adding at least one of a plurality of predetermined colors to at least part of the virtual environment, the predetermined colors being respectively associated with different intended effects on the user.

5. The method of claim 1, wherein producing a visual element comprises adding at least one of a plurality of predetermined icons or words to at least part of the virtual environment, the predetermined icons or words being respectively associated with different intended effects on the user.

6. The method of claim 1, further comprising modifying the visual element to change one or more of:

i. brightness;

ii. saturation;

iii. shape; and iv. scale, responsive to one or more sound components of the sound.

7. The method of claim 1, wherein producing the visual element comprises adding the visual element at a location in the virtual environment corresponding to a location of the virtual sound source.

8. The method of claim 1, wherein producing the visual element comprises adding the visual element at a location in the virtual environment corresponding to a direction or a location of the sound relative to a predetermined position within a virtual sound stage.

9. The method of claim 1, wherein producing the visual element comprises driving a directional illumination separate to a primary display of the virtual environment.

10. The method of claim 9, wherein the directional illumination comprises one or more of:

i. a directional illumination physically surrounding the primary display;

ii. a directional illumination physically surrounding the user; and iii. a directional illumination located on a handheld controller used by the user.

11. The method of claim 1, wherein the visual element is produced as an overlay at a location in the virtual environment corresponding to a direction or location of the sound relative to a predetermined position within a virtual sound stage.

12. The method of claim 1, wherein the consistent visual grammar is provided by an operating system or a helper application for consistency across a plurality of different software products.

13. The method of claim 1, further comprising suspending production of the visual element during scripted game elements and resuming thereafter.

14. The method of claim 1, wherein the metadata associated with the sound is generated by analyzing the sound to identify one or more audio properties, and the generated metadata is used during gameplay to produce the visual element while the corresponding sound is being output.

15. The method of claim 1, wherein producing the visual element comprises displaying an onomatopoeia word selected according to the classified intended effect.

16. A non-transitory, computer-readable storage medium having stored thereon computer executable instructions adapted to cause a computer system to perform a method comprising:

generating a virtual environment comprising a virtual sound source;

prior to outputting a sound, classifying an intended effect on a user of the sound that is to be output to the user, the sound corresponding to the virtual sound source, a class of the intended effect being selected from (i) understanding, (ii) awareness, (iii) emotion, and (iv) physiological response, wherein classifying the intended effect on the user comprises analyzing metadata associated with the sound and metadata associated with the virtual sound source;

selecting, according to a consistent visual grammar, a type of visual element based on the classified intended effect, the type of visual element being selected from a color, an icon, a word, or a shape;

outputting the sound; and producing a visual element of the selected type of visual element for view by the user that has at least one visual property selected to correspond to the classified intended effect, the at least one visual property including one or more of brightness, saturation, shape, and scale.

17. An apparatus, comprising:

one or more processors;

one or more computer-readable storage media storing instructions which, when executed by the one or more processors, cause the apparatus to perform operations comprising:

generating a virtual environment comprising a virtual sound source;

prior to outputting a sound, classifying an intended effect on a user of the sound that is to be output to the user, the sound corresponding to the virtual sound source, a class of the intended effect being selected from (i) understanding, (ii) awareness, (iii) emotion, and (iv) physiological response, wherein classifying the intended effect on the user comprises analyzing metadata associated with the sound and metadata associated with the virtual sound source;

selecting, according to a consistent visual grammar, a type of visual element based on the classified intended effect, the type of visual element being selected from a color, an icon, a word, or a shape;

outputting the sound; and producing a visual element of the selected type of visual element for view by the user that has at least one visual property selected to correspond to the classified intended effect, the at least one visual property including one or more of brightness, saturation, shape, and scale.

* * * * *